(12) United States Patent
Warren et al.

(10) Patent No.: US 9,927,308 B1
(45) Date of Patent: Mar. 27, 2018

(54) TEMPERATURE SENSOR CALIBRATION OF AN ENTIRE WAFER IN A LIQUID BATH

(71) Applicant: Maxim Integrated Products, Inc., San Jose, CA (US)

(72) Inventors: Dewight Lee Warren, Dalls, TX (US); Chad David Erickson, Frisco, TX (US); Benjamin Alvin Draper, Arlington, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 357 days.

(21) Appl. No.: 14/709,278

(22) Filed: May 11, 2015

Related U.S. Application Data

(60) Provisional application No. 61/992,366, filed on May 13, 2014.

(51) Int. Cl.
*G01K 7/01* (2006.01)
*G01K 15/00* (2006.01)

(52) U.S. Cl.
CPC ............. *G01K 15/005* (2013.01); *G01K 7/01* (2013.01)

(58) Field of Classification Search
CPC .. G01K 7/02; G01K 7/10; G01K 7/22; G01K 11/32; G01K 13/00; G01K 13/02; G01K 2205/04; G01K 2013/024; G01J 5/004; G01J 5/043; G01J 5/0821; H01R 4/023; H01R 4/029; H01R 43/28; B23K 31/02; A47J 43/287; F16B 2/02; F16B 1/00; F16B 47/00; F16B 2001/0035; F16M 13/02; F16M 13/022; G01N 33/02
See application file for complete search history.

(56) References Cited

U.S. PATENT DOCUMENTS

| | | | | |
|---|---|---|---|---|
| 5,967,661 | A * | 10/1999 | Renken | G01K 15/00 374/126 |
| 2006/0174720 | A1 * | 8/2006 | Renken | G01D 9/005 374/126 |
| 2008/0043803 | A1 * | 2/2008 | Bandoh | G01K 1/143 374/100 |
| 2014/0367266 | A1 * | 12/2014 | Budiarto | G01B 7/105 324/207.15 |

* cited by examiner

*Primary Examiner* — Manish S Shah
(74) *Attorney, Agent, or Firm* — North Weber & Baugh LLP (57) ABSTRACT

A system for calibrating sensors in a wafer is provided. The system includes a container for containing liquid and configured to accommodate the wafer in the liquid; a temperature controller for controlling a temperature of the liquid; and an electrical connection mechanism for receiving electrical signals to the sensors when the temperature of the liquid reaches a preset level during operation. The system also includes a device that receives the signals from the sensors and calibrates the sensors based on the temperature of the liquid and the received signals from the sensors.

20 Claims, 7 Drawing Sheets

TEMPERATURE SENSOR CALIBRATION OF AN ENTIRE WAFER IN A LIQUID BATH

CROSS REFERENCE TO RELATED APPLICATIONS

This application claims the benefit of U.S. Provisional Application No. 61/992,366, entitled "Temperature sensor calibration of an entire wafer in a liquid bath," filed on May 13, 2014, which is incorporate herein by its entirety.

BACKGROUND

Technical Field

The present invention relates to systems and methods for calibrating sensors, and more particularly, to systems and methods for calibrating temperature sensors deposited on a wafer in a liquid bath.

Background of the Invention

Currently, temperature sensors are used in various applications, such as monitoring and controlling temperature of circuit boards, controlling CPU temperatures, and telecommunication devices, etc. To calibrate the temperature sensors, such as silicon thermometers, the sensors are manufactured on a wafer, diced and packed to form integrated circuit (IC) sensors. Then, each of the IC sensors is mounted in a socket formed on a printed circuit board (or, shortly, board) and calibrated while the board is immersed in a liquid bath.

Figure 1:
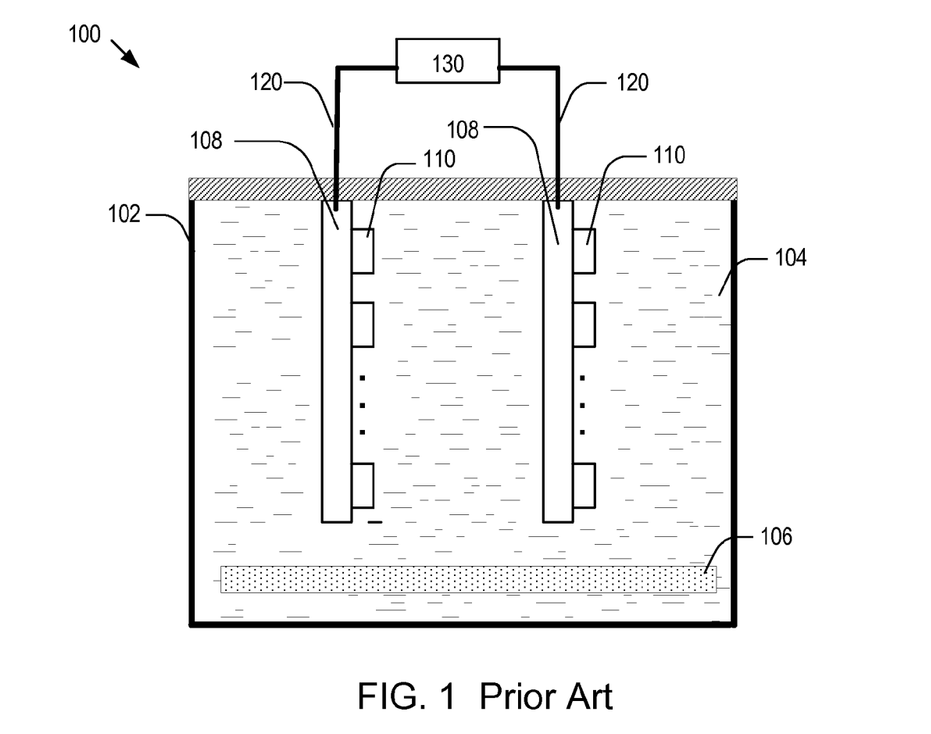
FIG. 1 is a schematic diagram of a conventional system for calibrating IC sensors.
Figure 2:
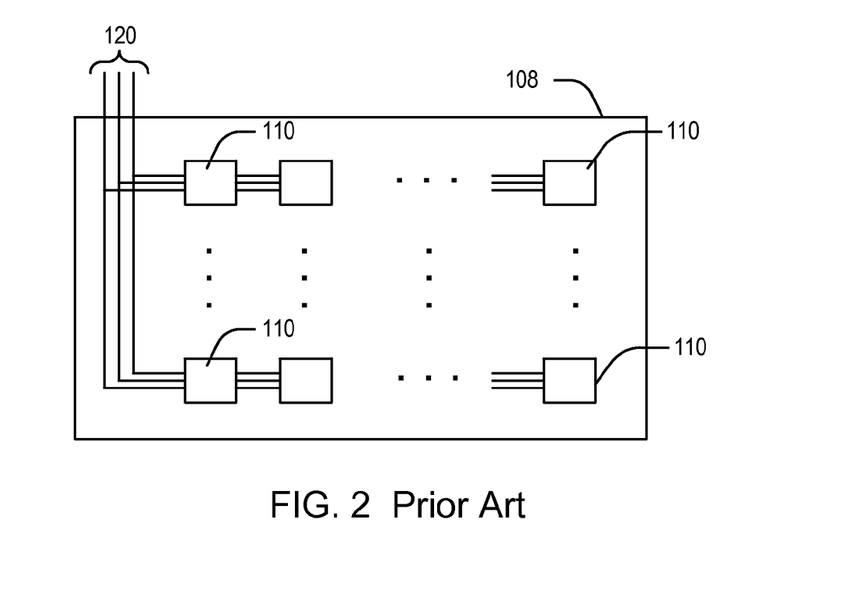
FIG. 2 is a side view of a board in FIG. 1.

FIG. 1 is a schematic diagram of a conventional system 100 for calibrating IC sensors and FIG. 2 is a side view of a board 108 in the system 100. As depicted, the system includes a container 102 for containing liquid 104 and multiple boards 108 having sockets for mounting IC sensors 110 therein, where each of the IC sensors is a package containing a sensor. Upon mounting the IC sensors in the sockets on the boards 108, the boards 108 are immersed in the liquid 104, while the temperature of the liquid is controlled by a heater 106. Each of the IC sensors 110 reads temperature of the liquid 104 and communicates signals to a controller 130, such as computer, coupled to the boards 108 via bus lines 120. The bus lines 120, which also provide electrical power to the IC sensors 110, are connected to printed circuits embedded in the boards 108. Upon receiving the signals from the sensors 110 through the bus lines 120, the controller 130 analyzes the signals and calibrates/tests the sensors 110.

The conventional system 100 has several problems. First, the boards 108 are mounted vertically in the liquid 104 and thus subject to vertical thermal gradient in the liquid. Currently, the thermal gradient in the liquid is one of the limiting factors of calibration accuracy. The typical calibration accuracy of conventional IC sensors is about 0.5° C., which is far greater than the acceptable calibration accuracy (0.1° C.) for clinical thermometers in medical applications. Second, the IC sensors are tested/calibrated after they are packaged. This leads to a lower production through-put because the packaged ICs mounted into sockets on a board have a much larger physical size than the individual sensors at the die level on the wafer and hence for a given liquid bath size, fewer packaged sensors can be calibrated at one time than sensors on a wafer. Lower through-put increases the calibration costs because of the required added equipment and time to process the same number of units.

Thus, there is a need for systems and methods for enhancing calibration accuracy and reducing calibration cost of thermal sensors.

SUMMARY OF THE INVENTION

According to another aspect of the present invention, a system for calibrating sensors in a wafer includes: a container for containing liquid and configured to accommodate the wafer in the liquid; a temperature controller for controlling a temperature of the liquid; and an electrical connection mechanism for receiving an electrical signal from the sensors so that the sensors can read the temperature of the liquid during operation.

According to another aspect of the present invention, a method for calibrating sensors includes: submerging a wafer having at least one sensor into liquid; causing a temperature of the liquid to reach a preset level; responsive to reaching of the temperature of the liquid to the preset level, receiving a signal from the at least one sensor; and calibrating the at least one sensor based on the temperature of the liquid and the signal.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

A reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Components shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Furthermore, one skilled in the art shall recognize: (1) that certain steps may optionally be performed; (2) that steps may not be limited to the specific order set forth herein; and (3) that certain steps may be performed in different orders, including being done contemporaneously.

Figure 3:
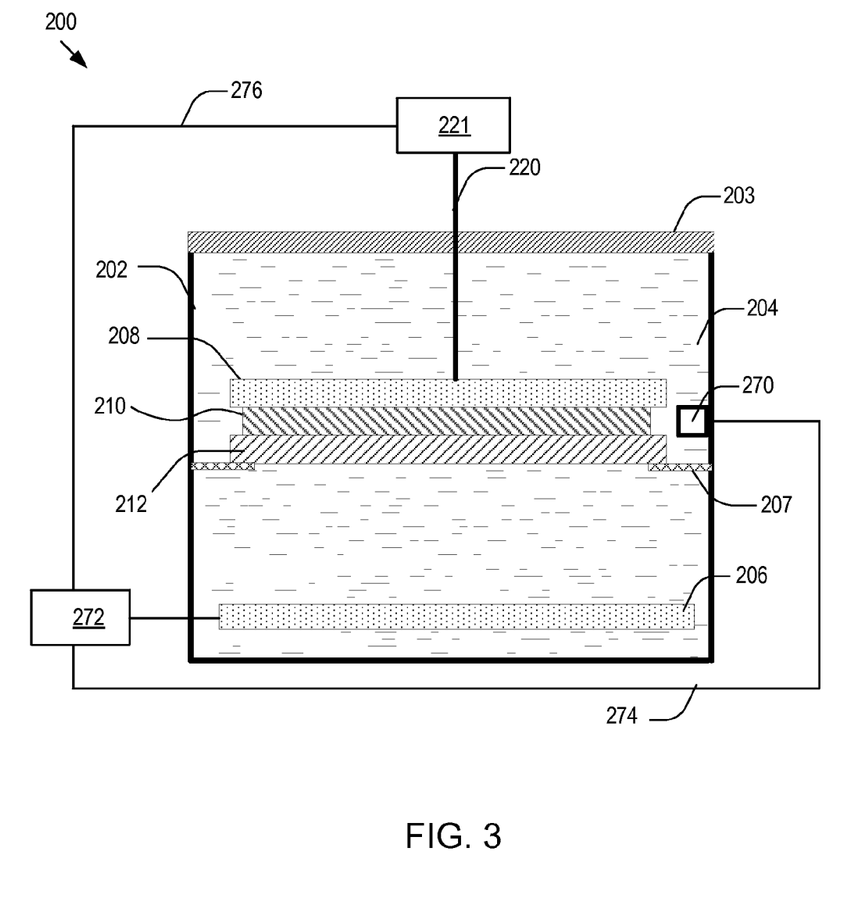
FIG. 3 is a schematic diagram of a system for calibrating temperature sensors in a wafer according to one embodiment of the present invention.

FIG. 3 is a schematic diagram of a calibration system 200 according to one embodiment of the present invention. As depicted, the system 200 includes: a container 202 for containing liquid 204; a heating/cooling unit 206 for heating and/or cooling the liquid; a temperature controller 272 for controlling the heating/cooling unit 206 to thereby control the temperature of the liquid 204; and a cover 203 for covering the top of the container 202. The heating/cooling unit 206 may be a suitable heating/cooling device, such as electrical heater or cooler. The liquid 204 may be any suitable fluid that can provide uniform temperature environment over the entire portion of the wafer 210 during operation.

In embodiments, the system 200 further includes a top plate 208 and a bottom plate (or, equivalently, substrate) 212, where a wafer 210 having multiple sensors to be tested/calibrated may be disposed therebetween during operation. The top and bottom plates may be formed of any suitable material, such as metal or silicon, and may be placed on a suitable mount 207 during operation. The top and/or bottom pates 208 and 212 have sufficient mechanical strength to protect the wafer 210 from mechanical damages and mechanically support the wafer 210 over the mount 207 during operation. Also, the top and/or bottom pates 208 and 212 may have sufficient thermal inertia to protect the wafer 210 from minor thermal disturbances during operation. In embodiments, the top plate 208 and the bottom plates 212 may have a clam shell box design so that the wafer 212 can be mounted/dismounted from these plates and the wafer 212 does not contact the liquid 204 during operation. In embodiments, the wafer 210 may be placed directly on the mount 207, i.e., the wafer 210 has sufficient mechanical strength to support itself over the mount 207 during operation without using the bottom plate 212.

An electrical line 220 has one end connected to an electrical device 221, such as computer, and the other end connected to the top plate 208. Hereinafter, the device 221 is also referred to as external calibration/control equipment (or, shortly, external controller) since the device is located outside the container 202. In embodiments, the device 221 may control/coordinate the operation of one or more of the components of the system 200. The electrical line 220 may include a bus line for communicating signals between the device 221 and the wafer 210 and providing electrical power to the wafer 210 during operation.

In embodiments, the system 200 may further include a thermometer 270 coupled to and controlled by the temperature controller 272. The thermometer 270 may be located near the wafer 212 so that the temperature measured by the thermometer 270 indicates the temperature of the liquid near the wafer 212. In embodiments, the signal from the thermometer 270 may be input to the temperature controller 272 via an electrical line 274, forming a feedback system for controlling the liquid temperature. In embodiments, the device 221 may control the temperature controller 272 through the line 276. In such a case, the signal from the thermometer 270 may be input to the device 221 so that the device 221 may control the temperature controller 272 using the signal from the thermometer 270. In embodiments, the thermometer 270 may be implemented in the heating/cooling unit 206 and controlled by the temperature controller 272 and/or the device 221. In FIG. 3, only one thermometer 270 is shown. However, it should be apparent to those of ordinary skill in the art that other suitable number of thermometers may be implemented in the system 200 so that the temperature of the liquid 204 near the wafer 210 is maintained at a target level.

Figure 4A:
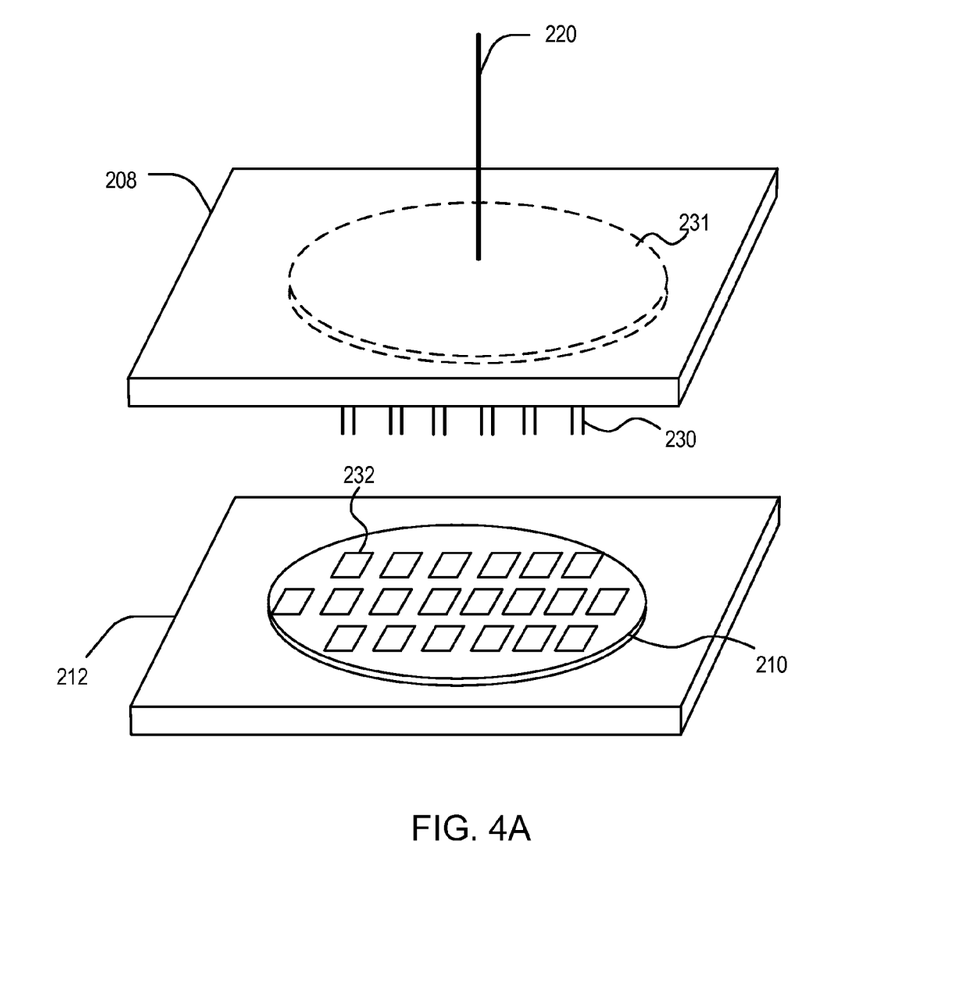
FIG. 4A is an exploded view of a portion of the system in FIG. 3 according to one embodiment of the present invention.

FIG. 4A is an exploded view of a portion of the system in FIG. 3 according to one embodiment of the present invention. As depicted, the top plate 208 includes one or more pins (such as pogo pins) 230 that are arranged to electrically contact die groups (or, equivalently sensor groups) 232 formed on the wafer 210. The bottom plate (or, substrate) 212 provide mechanical support for the wafer 210. The electrical line 220 is electrically connected to the pins 230 so that the device 221 can communicate signals and provide electrical power to the die groups 232. An electrical circuit 231, which may be implemented in the top plate 208 or attached to the bottom surface of the top plate 208, represents an electrical circuit for coupling the electrical line 220 to the pins 230.

Figure 4B:
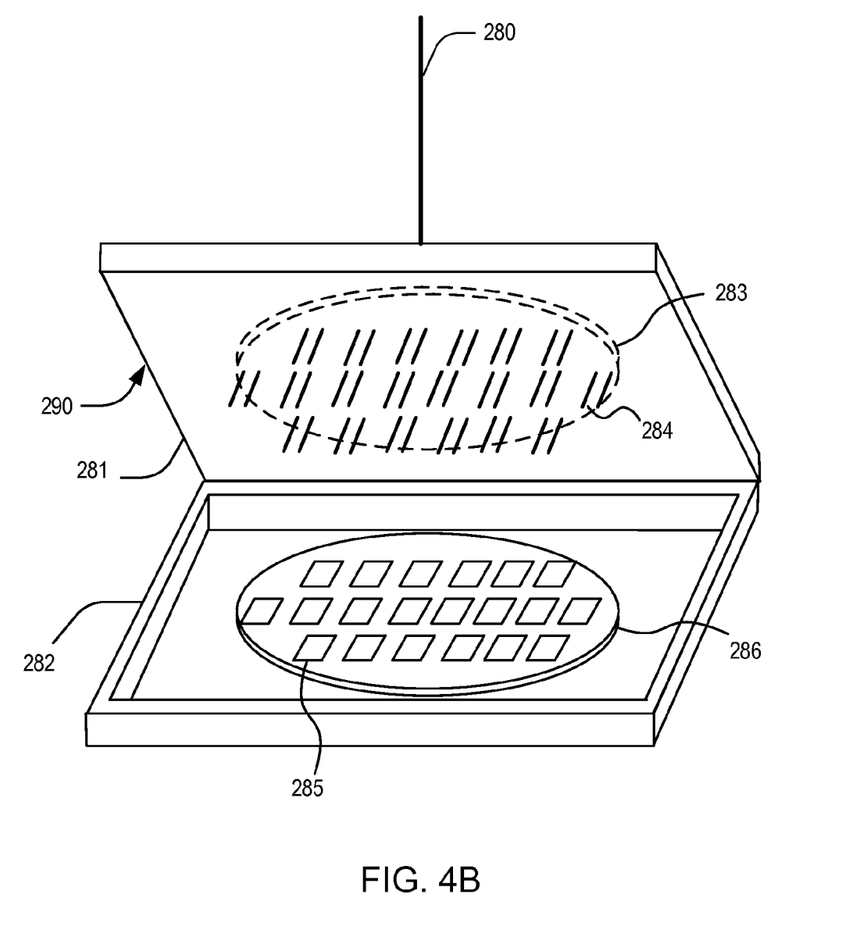
FIG. 4B is an exploded view of a portion of the system in FIG. 3 according to another embodiment of the present invention.

FIG. 4B is an exploded view of a portion of the system in FIG. 3 according to another embodiment of the present invention. As depicted, the top cover 281 and the bottom container 282 may form a clam shell box 290 so that the wafer 286 may be mounted/dismounted from the box. The electrical line 280 has one end connected to an electrical device (such as 221) and the other end connected to the clam shell box 290. More specifically, an electrical circuit 283 may be disposed inside the top cover 281 or attached to the bottom surface of the top cover 281 and couple the electrical line 280 to the pins 284, such as pogo pins. The pins 284 are configured to contact the die groups 285 in the wafer 286 when the top cover 281 is closed.

Figure 5:
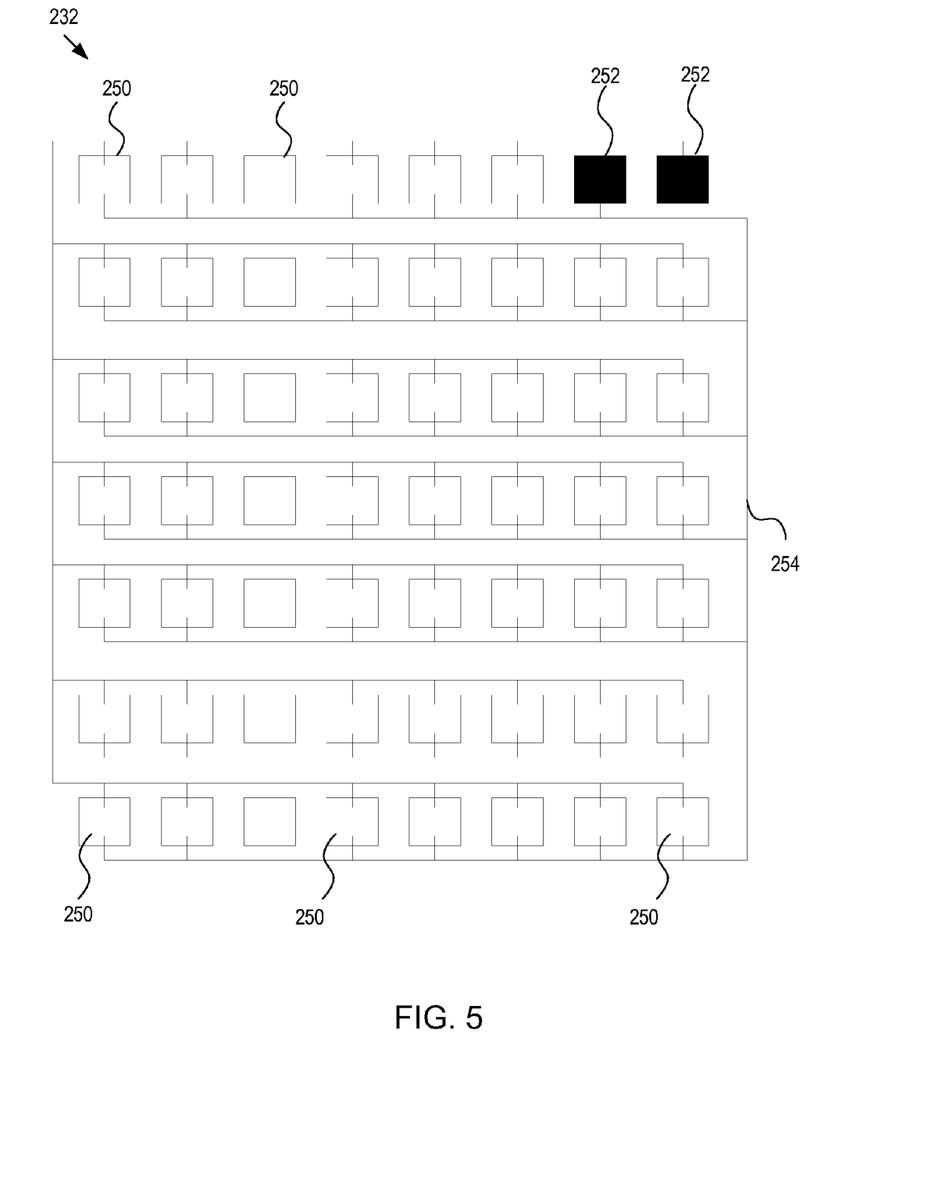
FIG. 5 is an enlarged view of a die group in FIGS. 4A and 4B.

FIG. 5 is an enlarged view of one of the die groups 232 (or 285), illustrating a common busing scheme of the wafer 210 (or 286). As depicted, each die group 232 (or 285)

includes: one or more sensors 250; bus lines 254 for electrically connecting the sensors 250; and a pair of electrical pads (or, shortly, a pair of pads) 252 that electrically contacts a corresponding pair of the pins 230 (or 284) during operation. In embodiments, the sensors 250 may be any suitable sensors, such as IC sensors, formed on the wafer 210 (or 286).

In embodiments, the bus lines 254 include one or more digital serial bus lines. Each of the sensors 250 communicates signals to the device 221 through the bus lines 254 and the pins 230 (or 284). (Hereinafter, the term electrical connection mechanism collectively refers to the components that participate in electrically coupling the device 221 to the sensors 250, i.e., it includes the wire 220 (or 280), pins 230 (or 284), pads 252, and bus lines 254.) Also, the device 221 may provide electrical power to the sensors 250 through the electrical connection mechanism. It is noted that only seventy sensors are shown in each die group 232 (or 285). However, it should be apparent to those of ordinary skill in the art that any suitable number of sensors 250 may be included in each die group. It is further noted that each die group 232 (or 285) includes only two pads 252, even though any other suitable number of pads may be coupled to each die group.

Figure 6:
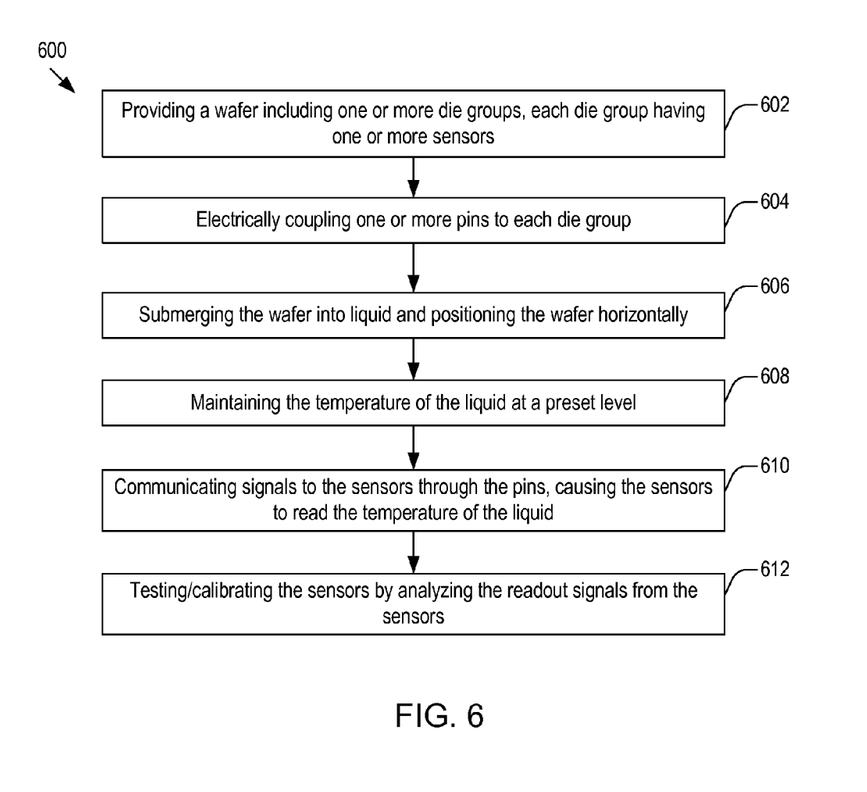
FIG. 6 a flowchart of an exemplary process for operating the system in FIG. 3 according to another embodiment of the present invention.

FIG. 6 is a flowchart 600 of an exemplary process for operating the system in FIG. 3 according to another embodiment of the present invention. At step 602, the wafer 210 (or 286) having one more die groups 232 (or 285) is provided, where each die group includes one or more sensors (or, dies) 250 to be tested/calibrated. Unlike the conventions systems that calibrate sensor packages mounted in sockets of a printed circuit board, the sensors 250 of the present invention are tested/calibrated while they are still embedded in the wafer 210 (or 286).

In embodiments, at step 604, the wafer 210 is placed over the bottom plate 212 and the top plate 208 is positioned over the wafer 210 so that pins 230 make electrical contacts with the pads 252 of the corresponding die group 232. In embodiments, the wafer 286 may be mounted in the clam shell box 290 and the top cover 281 is closed so that the pins 284 make electrical contacts with the pads 252.

Next, at step 606, the wafer is submerged into the liquid 204 and positioned horizontally. In embodiments, the wafer 210, plate and bottom plates 208 and 212 may be submerged into the liquid 204. In another embodiment, the wafer 210 and the top plate 208 may be submerged, where the wafer 201 is mounted directly on the mount 207. In yet another embodiment, the clam shell box 290 containing the wafer 286 may be submerged in the liquid 204.

It is noted that the wafer is position horizontally in the liquid 204. Unlike in the convention systems where the boards 108 are positioned vertically in the liquid 104, the wafer 210 (or 286) of the present invention is positioned horizontally in the liquid 204 so that the wafer is subject to less thermal gradient. Such a thermally flat environment in the liquid 204 can reduce the uncertainty in the calibration of the sensors.

At step 608, the temperature of the liquid 204 is changed to and maintained at a preset level by the temperature controller 230 (or, by the device 221 if the device 221 is configured to control the temperature controller 230). The temperature controller 230 (or device 221) may control the heating/cooling unit 206 to control the temperature of the liquid 204. In embodiments, the temperature of the liquid 204 may be measured by one or more thermometers 270. In embodiments, the thermometer may be included in the heating/cooling unit 206.

At step 610, the device (external calibration/control equipment) 221 exchanges electrical signals with the sensors 250 through the bus line 254, pads 252 and electrical line 220 (or 280). In embodiments, the device 221 may send control signals and electrical power to the sensors 250 and receive readout signals from the sensors 250. In embodiments, the electrical readout signal includes digital serial data and the bus line 254 is a digital serial data bus.

In embodiments, the device 221 may monitor the magnitudes of the signals received from each sensor 250 to determine whether the temperature of the sensor has reached a steady state, and take the steady state signal as the readout signal of the sensor. In embodiments, the material and dimension, such as wall thickness, of the top and bottom plates 208 and 212 may be determined so that the temperature of the sensor 250 at the steady state is the same as the preset temperature of the liquid 204. In embodiments, the device 221 may repeat the steps 608 and 610 to get the readout signals from each of the sensors 250 at various target temperatures of the liquid 204.

At step 612, the device 221 may test/calibrate the sensors 250 by analyzing the readout signals from the sensors 250. In embodiments, the device 221 may compare the temperature of the liquid 204 to the readout signals from the sensors 250 to calibrate the sensors 250 and/or test the sensors 250. After calibration, the wafer 210 may be diced and the sensors 250 may be used in various applications.

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present invention may be implemented in any instruction-execution/computing device or system capable of processing data, including, without limitation, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 7:
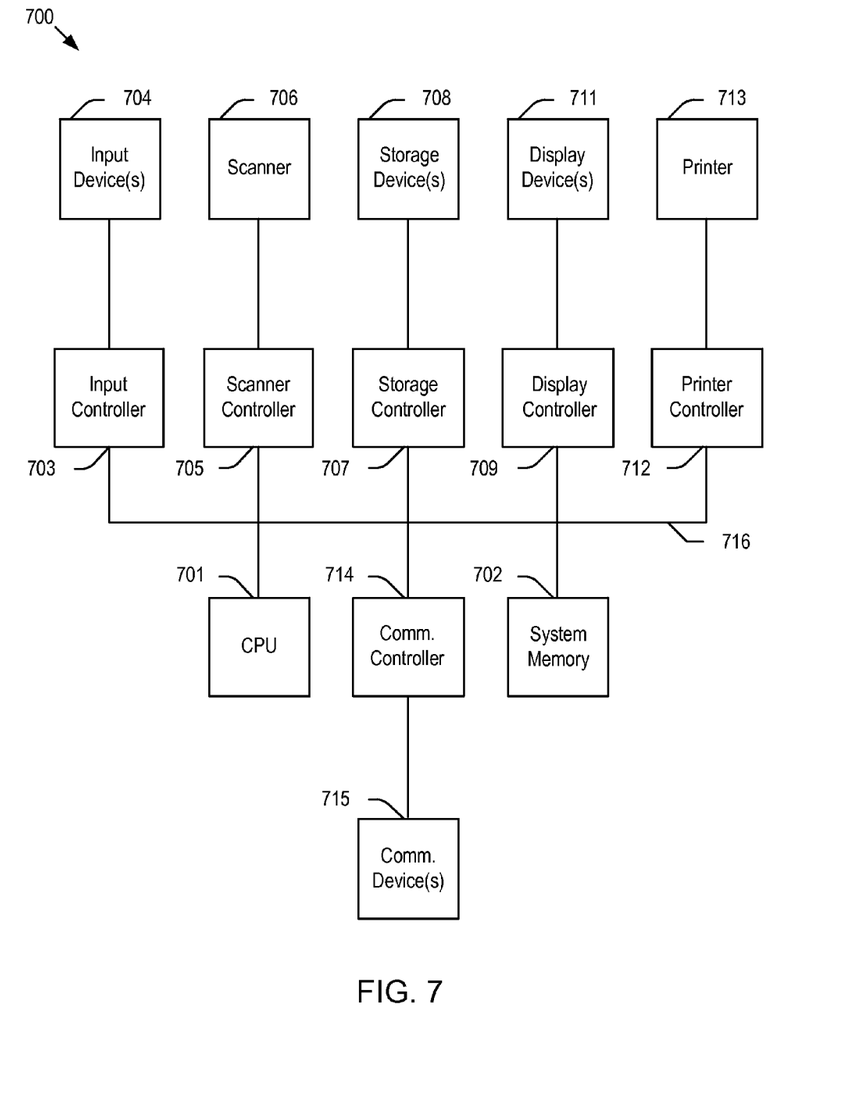
FIG. 7 shows a computer system according to embodiments of the present invention.

Having described the details of the invention, an exemplary system 700, which may be used to implement one or more aspects of the device 221, will now be described with reference to FIG. 7. As illustrated in FIG. 7, the system 700 includes a central processing unit (CPU) 701 that provides computing resources and controls the computer. CPU 701 may be implemented with a microprocessor or the like, and may also include a graphics processor and/or a floating point coprocessor for mathematical computations. The system 700 may also include a system memory 702, which may be in the form of random-access memory (RAM) and read-only memory (ROM).

A number of controllers and peripheral devices may also be provided, as shown in FIG. 7. An input controller 703 represents an interface to various input device(s) 704, such as a keyboard, mouse, or stylus, as well as the buttons. There may also be a scanner controller 705, which communicates with a scanner 706. The system 700 may also include a storage controller 707 for interfacing with one or more storage devices 708 each of which includes a storage medium such as magnetic tape or disk, or an optical medium that might be used to record programs of instructions for operating systems, utilities and applications which may include embodiments of programs that implement various aspects of the present invention. The storage device(s) 708 may also be used to store processed data or data, such as information received from the sensors 250, to be processed in accordance with the invention. The system 700 may also include a display controller 709 for providing an interface to a display device 711, which may be a cathode ray tube (CRT), a thin film transistor (TFT) display, or other type of display. The system 700 may also include a printer controller 712 for communicating with a printer 713. A communications controller 714 may interface with one or more communication devices 715, which enables the system 700 to connect to remote devices through any of a variety of networks including the Internet, a local area network (LAN), a wide area network (WAN), or through any suitable electromagnetic carrier signals including infrared signals. In the illustrated system, all major system components may connect to a bus 716, which may represent more than one physical bus.

It is noted that various system components in FIG. 7 may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A system for calibrating sensors in a wafer, comprising:
   a container for containing liquid and configured to accommodate the wafer in the liquid;
   a temperature controller for controlling a temperature of the liquid; and
   an electrical connection mechanism for receiving an electrical signal from each of the sensors in the wafer when the temperature of the liquid reaches a preset level during operation.

2. A system as recited in claim 1, further comprising:
   a bottom plate for mounting the wafer thereon and positioning the wafer horizontally in the liquid.

3. A system as recited in claim 1, further comprising:
   a mount for holding the wafer horizontally in the liquid.

4. A system as recited in claim 1, further comprising:
   a top plate having one or more pins for contacting the sensors,
   wherein the electrical connection mechanism includes an electrical wire connected to the one or more pins.

5. A system as recited in claim 4, wherein the wafer includes one or more die groups, each of the die groups includes one or more sensors and one or more electrical pads, and the one or more pins are arranged to electrically contact the one or more electrical pads during operation.

6. A system as recited in claim 4, further comprising:
   a bottom plate for mounting the wafer thereon.

7. A system as recited in claim 1, further comprising a clam shell box for accommodating the wafer therein.

8. A system as recited in claim 1, further comprising:
   a device connected to the electrical connection mechanism and adapted to communicate signals to each of the sensors through the electrical connection mechanism.

9. A system as recited in claim 1, further comprising:
   at least one thermometer to measure the temperature of the liquid.

10. A method for calibrating sensors in a wafer, comprising:
    (a) submerging a wafer having at least one sensor into liquid;
    (b) causing a temperature of the liquid to reach a preset level;
    (c) responsive to reaching of the temperature of the liquid to the preset level, receiving a signal from the at least one sensor; and
    (d) calibrating the at least one sensor based on the temperature of the liquid and the signal.

11. A method as recited in claim 10, wherein the step of submerging the wafer includes positioning the wafer horizontally.

12. A method as recited in claim 10, further comprising:
    monitoring magnitudes of a plurality of signals from the at least one sensor; and
    based on the monitored magnitudes, determining whether the temperature of the liquid has reached the preset level.

13. A method as recited in claim 10, further comprising:
    mounting the wafer on a bottom plate, wherein the bottom plate is submerged in the liquid horizontally.

14. A method as recited in claim 10, wherein the wafer includes one or more die groups and wherein each of the die groups has one or more sensors and one or more electrical pads electrically coupled to the one or more sensors.

15. A method as recited in claim 14, further comprising:
    providing a top plate having one or more pins; and
    mounting the top plate on the wafer, causing the one or more pins to electrically contact the one or more electrical pads.

16. A method as recited in claim 15, further comprising:
    mounting the wafer on a bottom plate, wherein the bottom and top plate form a clam shell box.

17. A method as recited in claim 10, wherein the signal includes digital serial data.

18. A method as recited in claim 11, further comprising:
    providing electrical power to the wafer.

19. A method as recited in claim 10, wherein the at least one sensor is an integrated circuit (IC) sensor.

20. A method as recited in claim 10, further comprising:
    repeating the steps (b) and (c) prior to the step (d).

* * * * *